United States Patent
Perigo et al.

(10) Patent No.: US 10,855,151 B2
(45) Date of Patent: Dec. 1, 2020

(54) ROTOR BALANCING/FIXATION VIA INJECTION OR COMPRESSION MOLDING

(71) Applicant: ABB Schweiz AG, Baden (CH)

(72) Inventors: Elio Alberto Perigo, Raleigh, NC (US); Cherif Ghoul, Raleigh, NC (US); Darren Tremelling, Apex, NC (US); Sheng Zhong, Hillsborough, NC (US); Colin Tschida, Durham, NC (US); Giulio Secondo, Genoa (IT)

(73) Assignee: ABB Schweiz AG, Baden (CH)

( * ) Notice: Subject to any disclaimer, the term of this patent is extended or adjusted under 35 U.S.C. 154(b) by 338 days.

(21) Appl. No.: 15/848,649

(22) Filed: Dec. 20, 2017

(65) Prior Publication Data

US 2019/0190358 A1   Jun. 20, 2019

(51) Int. Cl.
| | | |
|---|---|---|
| *H02K 15/02* | (2006.01) | |
| *H02K 15/03* | (2006.01) | |
| *H02K 1/27* | (2006.01) | |
| *H02K 15/16* | (2006.01) | |
| *H02K 7/04* | (2006.01) | |

(Continued)

(52) U.S. Cl.
CPC .............. *H02K 15/03* (2013.01); *H02K 1/27* (2013.01); *H02K 7/04* (2013.01); *H02K 15/024* (2013.01);
(Continued)

(58) Field of Classification Search
CPC ......... Y10T 29/49012; Y10T 29/49009; Y10T 29/49071; Y10T 29/49073;
(Continued)

(56) References Cited

U.S. PATENT DOCUMENTS 7,814,641 B2 * 10/2010 Du .................... H01R 43/10
264/272.2
9,800,125 B2 * 10/2017 Ballweg .............. H02K 19/14
(Continued)

FOREIGN PATENT DOCUMENTS

CN   106059233 A   10/2016
DE   102015203018 A1   8/2016
(Continued)

OTHER PUBLICATIONS

European Patent Office, Extended European Search Report in European Patent Application No. 18213582.2, 14 pp., (May 28, 2019).

*Primary Examiner* — Thiem D Phan
(74) *Attorney, Agent, or Firm* — Leydig, Voit & Mayer, Ltd.

(57) ABSTRACT

A method of balancing a rotor and/or fixing rotor components includes arranging a plurality of generally like laminations side by side in a stack to form at least a part of a rotor. The rotor has a rotational center axis and each of the laminations having a plurality of apertures that cooperate to form passages that extend axially along a length of the stack. In accordance with an aspect of the method, a polymer based fixation material is filled in the passages in a manner to fix the laminations together in the stack. With the fixation material, a sprue is formed, projecting from an axial face of the stack. In accordance with another aspect of the method, a weight of the sprue is adjusted to rotationally balance the rotor about the rotor center axis.

9 Claims, 13 Drawing Sheets

(51) Int. Cl.
  *B29C 43/00* (2006.01)
  *B29C 45/00* (2006.01)
  *H02K 1/32* (2006.01)
  *H02K 15/12* (2006.01)
  *H02K 9/06* (2006.01)

(52) U.S. Cl.
  CPC ............ *H02K 15/165* (2013.01); *B29C 43/00* (2013.01); *B29C 45/00* (2013.01); *H02K 1/32* (2013.01); *H02K 9/06* (2013.01); *H02K 15/12* (2013.01); *Y10T 29/49012* (2015.01)

(58) Field of Classification Search
  CPC ........ Y10T 29/49075; Y10T 29/49078; H02K 7/04; H02K 15/0012
  USPC .................. 29/598, 557, 558, 596, 606, 609
  See application file for complete search history.

(56) References Cited

U.S. PATENT DOCUMENTS

| | | |
|---|---|---|
| 2013/0042655 A1 | 2/2013 | Batsuo et al. |
| 2017/0179801 A1 | 6/2017 | Ballweg et al. |
| 2017/0331338 A1 | 11/2017 | Asahi |

FOREIGN PATENT DOCUMENTS

| | | |
|---|---|---|
| DE | 202017103926 U1 | 8/2017 |
| EP | 0911537 A1 | 4/1999 |
| EP | 2685618 A1 | 1/2014 |
| JP | 2005-304137 A | 10/2005 |
| JP | 2007-174842 A | 7/2007 |
| JP | 2007-218942 A | 12/2007 |
| JP | 2013-017297 A | 1/2013 |

\* cited by examiner

ROTOR BALANCING/FIXATION VIA INJECTION OR COMPRESSION MOLDING

BACKGROUND

The disclosure relates to rotors of electric motors, and in particular, reluctance machines and permanent magnet machines. More in particular, the disclosure relates to balancing of the rotor and rotor component fixation via injection or compression molding.

DETAILED DESCRIPTION

Figure 1:
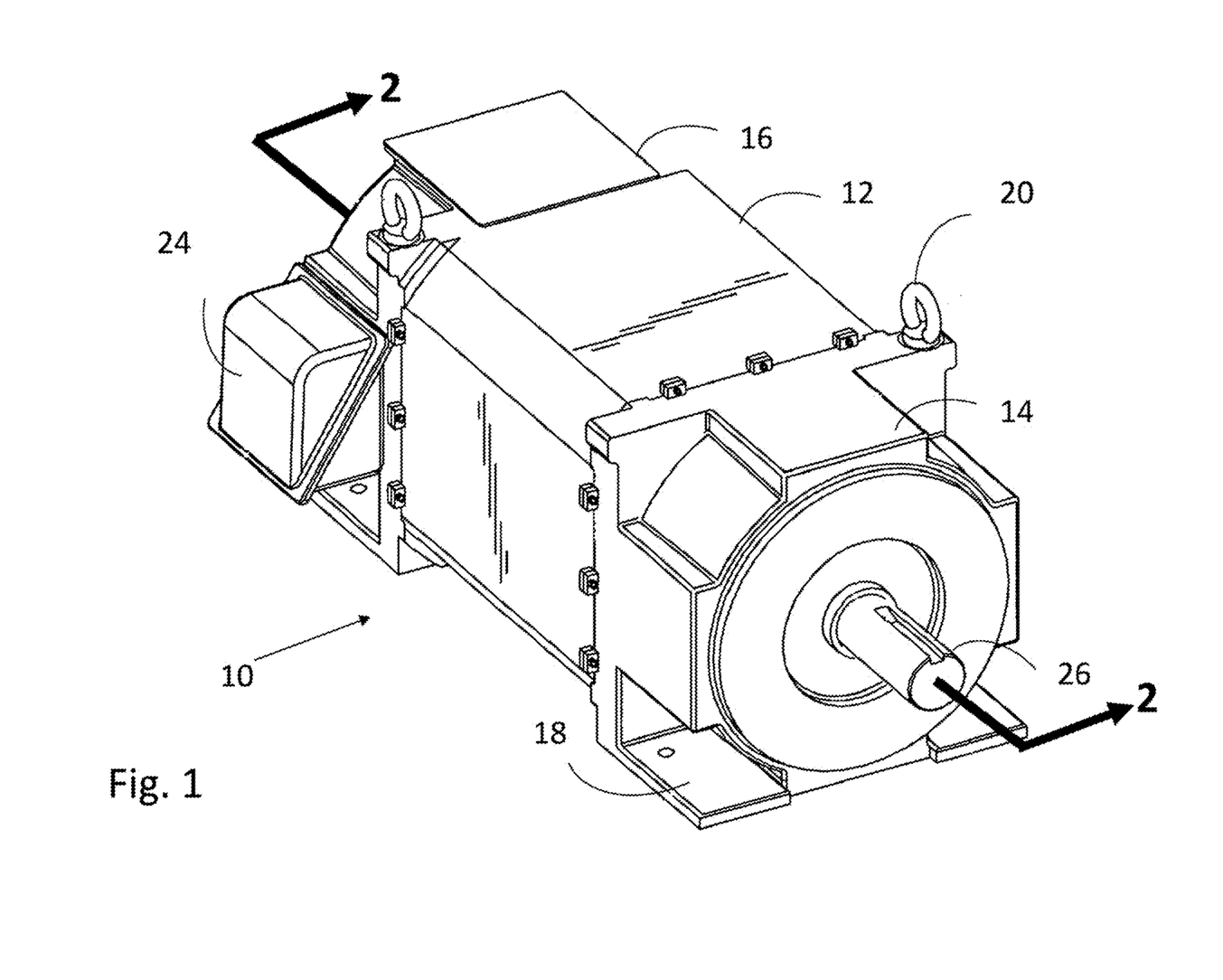
FIG. 1 is a perspective view of an exemplary permanent magnet motor in which the techniques described herein may be used.

Turning to the drawings, FIG. 1 illustrates an exemplary permanent magnet motor 10. The exemplary motor 10 comprises a frame 12 capped at each end by drive and opposite drive end caps 14,16, respectively. The frame 12 and the drive and opposite drive end caps 14,16 cooperate to form the enclosure or motor housing for the motor 10. The drive and opposite drive end caps 14,16 may include mounting and transportation features, such as the illustrated mounting feet 18 and eyehooks 20. A conduit box 24 houses the electrical connection between the terminal leads and the external power source. A rotor shaft 26 coupled to the rotor rotates in conjunction with the rotor, and may be coupled to any number of drive machine elements, such as pumps, compressors, fans, conveyors, and so forth.

Figure 2:
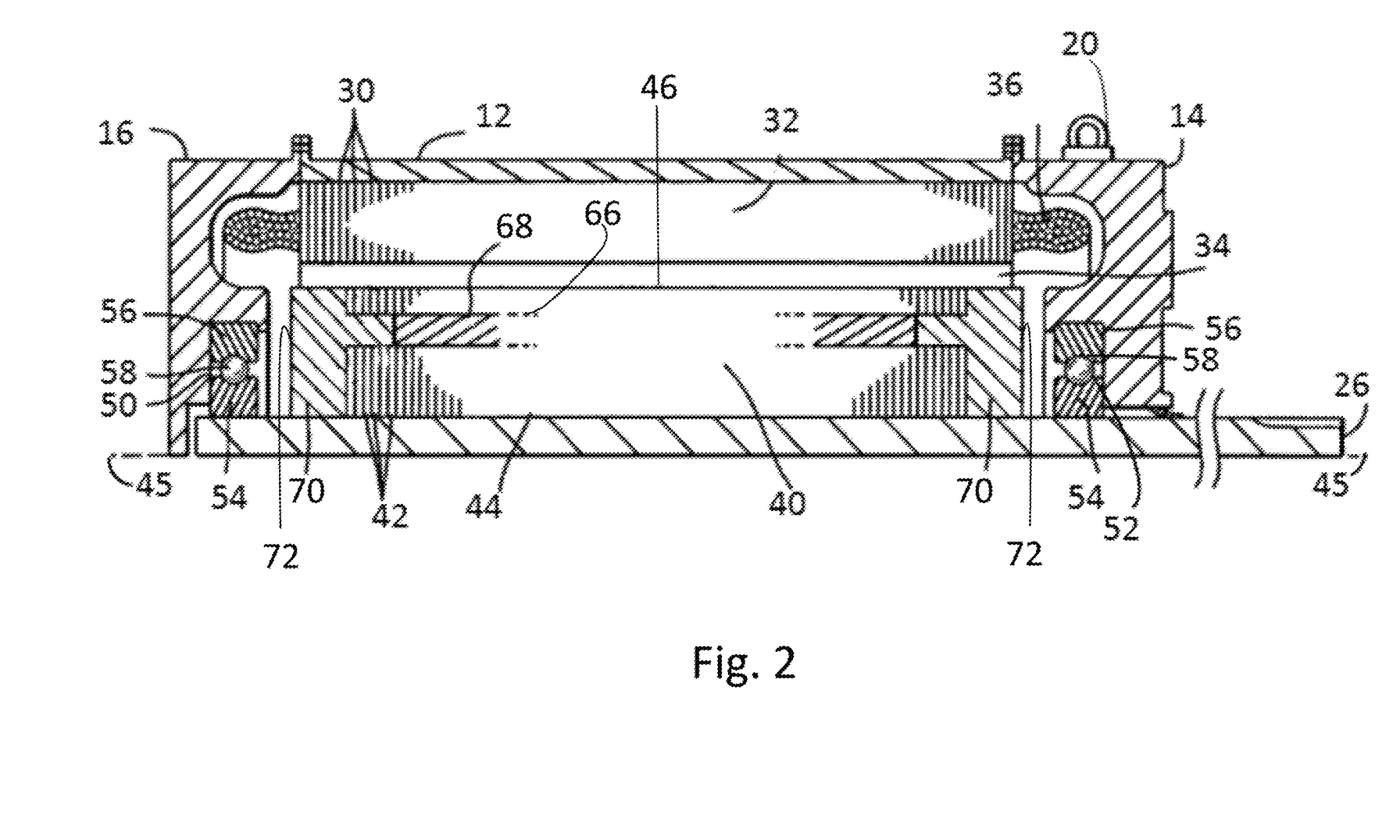
FIG. 2 is a partial, cross-section view of an embodiment of the motor of FIG. 1 along plane 2-2.
Figures 3, 4:
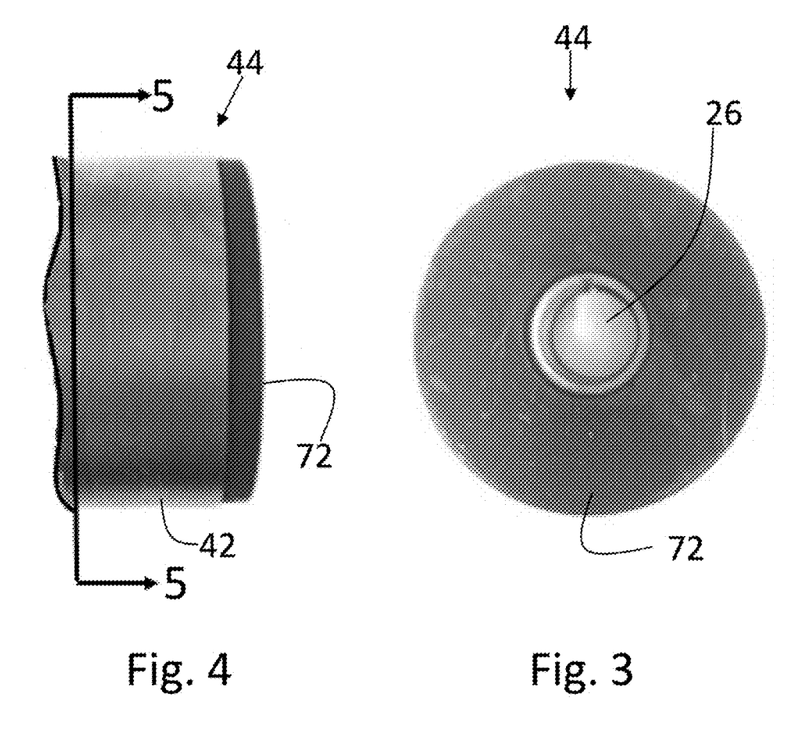
FIG. 3 is an end view of an embodiment of a rotor of the motor of FIG. 1.
FIG. 4 is a partial, side view of a portion of the rotor of FIG. 3.
Figure 5:
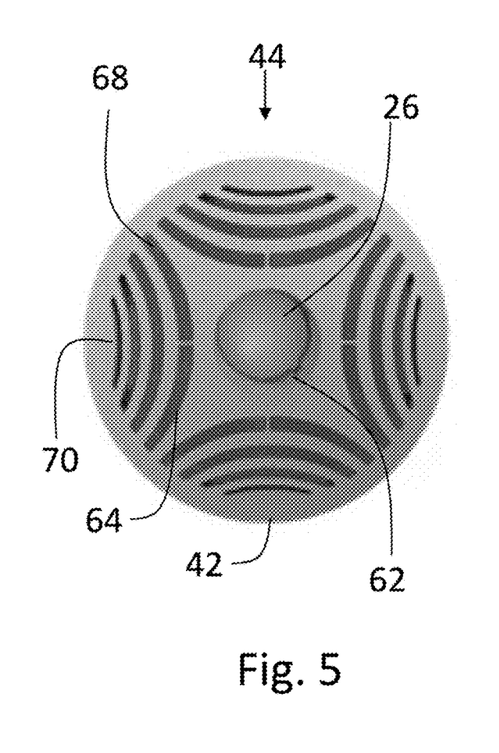
FIG. 5 is a cross section view of the rotor along plane 5-5 of FIG. 4.
Figure 6:
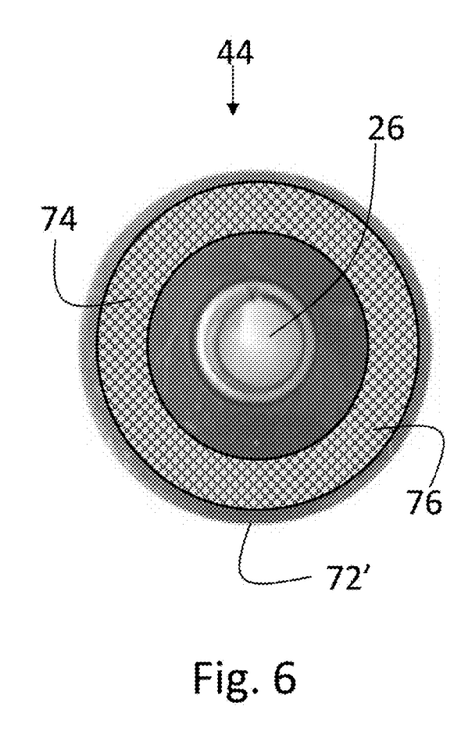
FIG. 6 is an end view of another embodiment of a rotor of the motor of FIG. 1.
Figure 7:
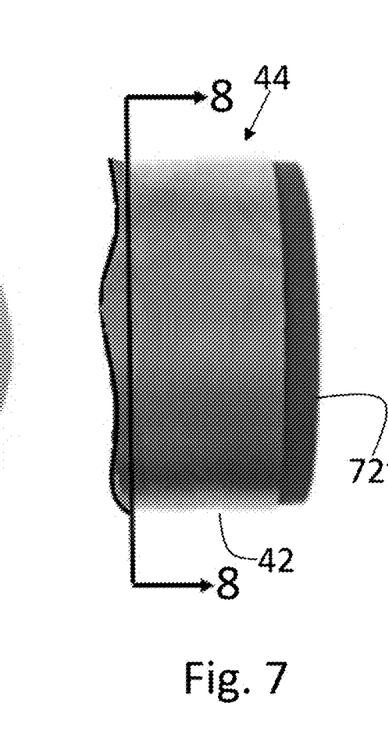
FIG. 7 is a partial, side view of a portion of the rotor of FIG. 6.
Figure 8:
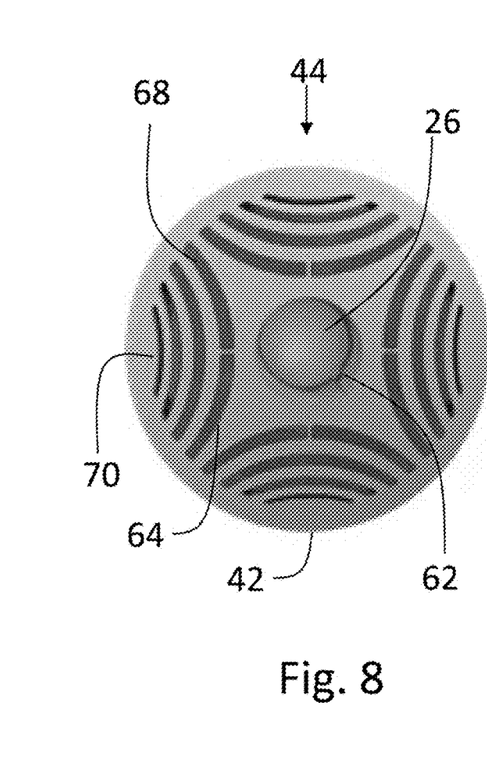
FIG. 8 is a cross section view of the rotor along plane 8-8 of FIG. 7.
Figures 9, 10:
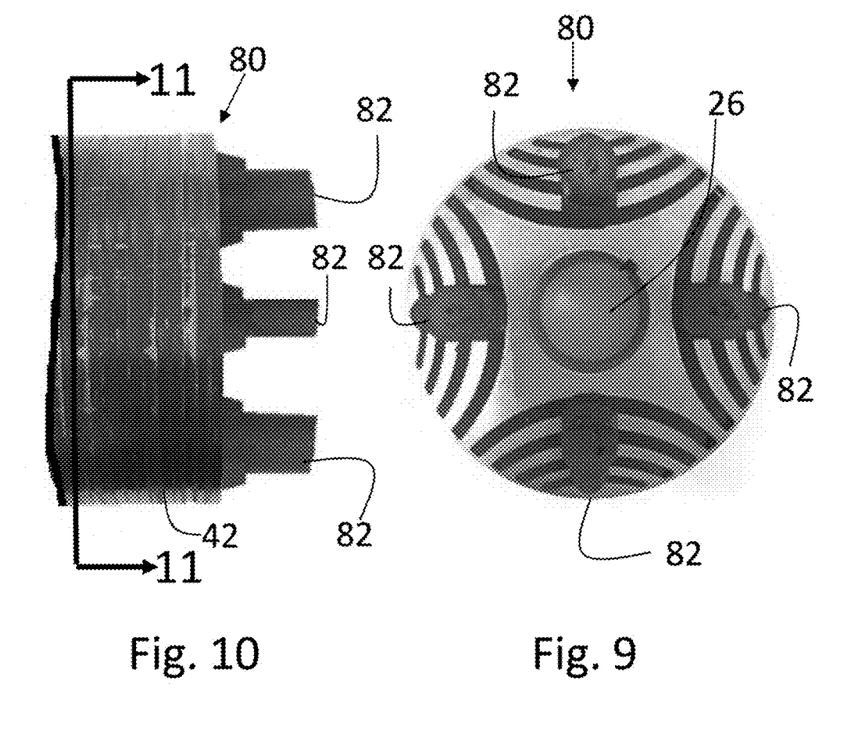
FIG. 9 is an end view of another embodiment of a rotor of the motor of FIG. 1.
FIG. 10 is a partial, side view of a portion of the rotor of FIG. 9.
Figure 11:
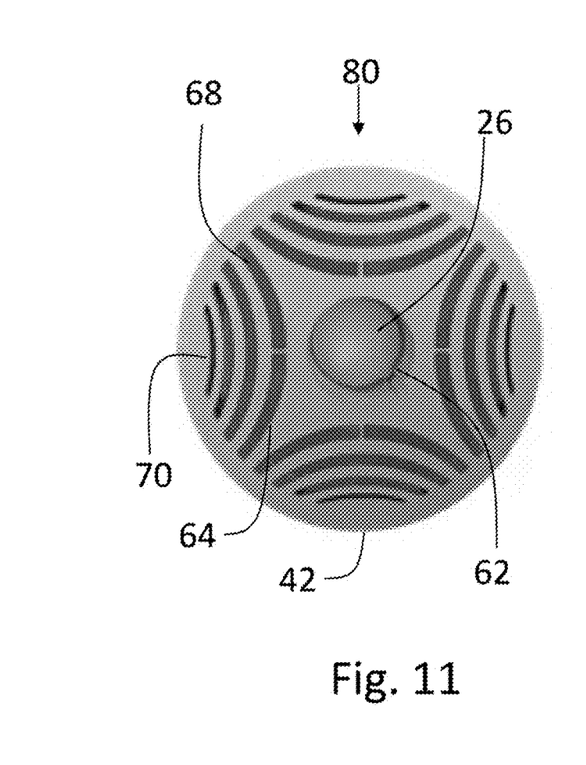
FIG. 11 is a cross section view of the rotor along plane 11-11 of FIG. 10.

FIG. 2 is a partial cross-section view of the motor 10 of FIG. 1 along plane 2-2. To simplify the discussion, only the top portion of the motor 10 is shown, as the structure of the motor 10 is essentially mirrored along its centerline. Within the enclosure or motor housing resides a plurality of stator laminations 30 juxtaposed and aligned with respect to one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 34 that extends the length of the stator core 32 and that is sized to receive a rotor. Additionally, each stator lamination 30 includes a plurality of stator slots disposed circumferentially about the central aperture. These stator slots cooperate to receive one or more stator windings 36, which are illustrated as coil ends in FIG. 2, that extend the length of the stator core 32.

Figure 18:
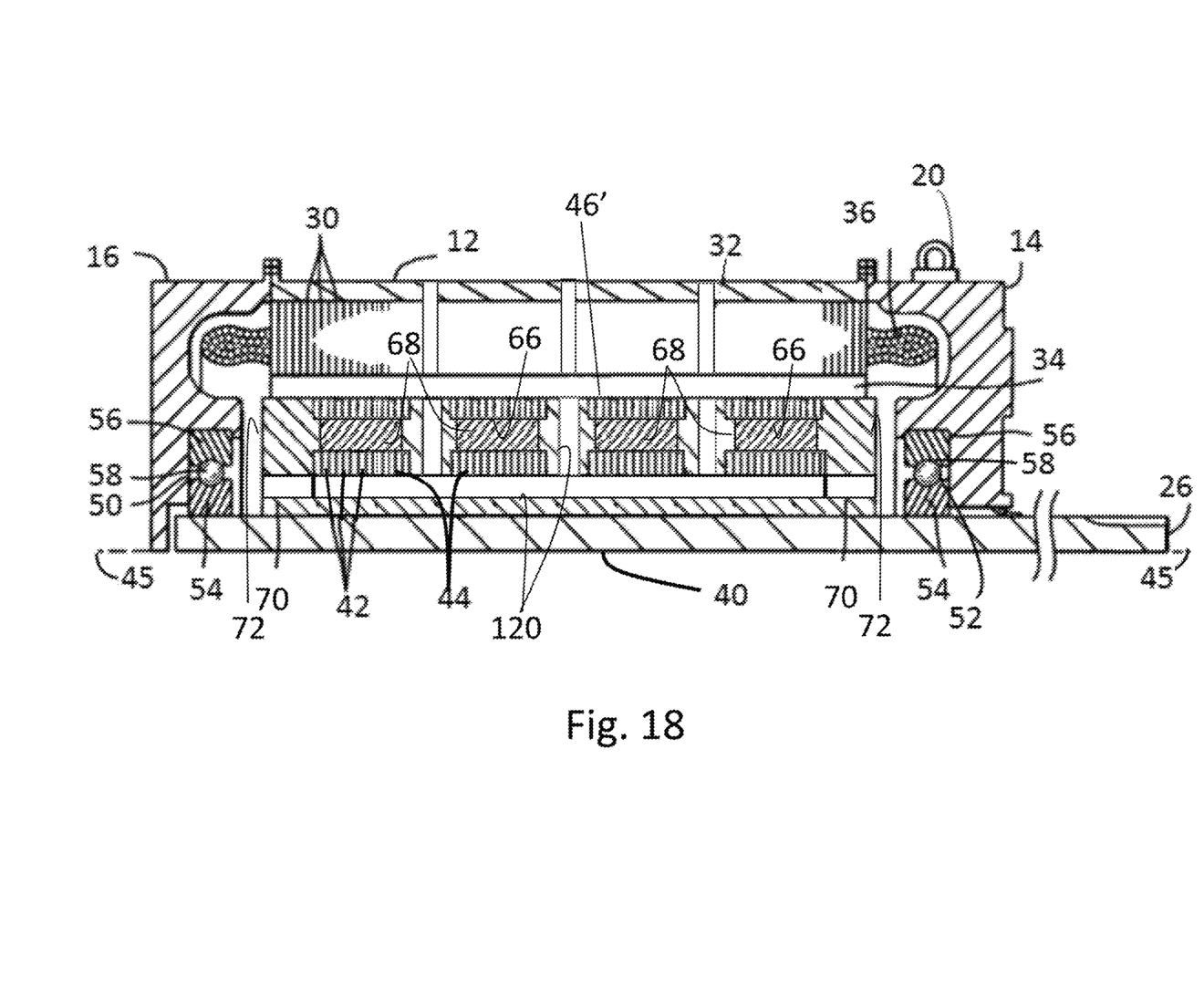
FIG. 18 is a partial, cross-section view of another embodiment of the motor of FIG. 1 along plane 2-2.

In the exemplary motor 10, a rotor assembly 40 resides within the rotor chamber 34. Similar to the stator core 32, the rotor assembly 40 comprises a plurality of rotor components, such as laminations 42 aligned and adjacently placed with respect to one another in a stack 44. A stack 44 of rotor components, such as laminations, may comprise a contiguous rotor core 46 or a part of a rotor core. When assembled, the rotor laminations 42 cooperate to form a shaft chamber that extends through the center of the stack 44 and rotor core 46, and that is configured to receive the rotor shaft 26 therethrough. The rotor shaft 26 is secured with respect to the rotor core 46 such that the rotor core 44 and the rotor shaft 26 rotate as a single entity about a rotor center axis 45. Although FIG. 2 shows the generally like laminations 42 arranged side by side in a single stack 44 that forms the entire contiguous rotor core 46, the generally like laminations may be arranged side by side to form the stacks 44 of laminations, and the stacks 44 of side by side laminations may be arranged in a spaced apart manner from one another along the rotor center axis 45 to form the rotor core 46, for instance, for a radially ducted motor, which by way of example is shown in FIG. 18, and which will be explained in greater detail below. Although the drawings show a rotor core with a side by side arrangement of laminations, the rotor core may include other rotor components, for instance, alternating soft magnetic blocks with soft magnetic composites.

The exemplary motor 10 includes drive and opposite drive bearing sets 50,52, respectively, that are secured to the rotor shaft 26 and that facilitate rotation of the rotor assembly 40 within the stationary stator core 32. Each bearing set 50,52 includes an inner race 54, an outer race 56 and rotational elements 58, which are disposed between the inner and outer races 54,56.

FIGS. 2-26 provide further detail of illustrative embodiments of the rotor component using laminations 42 as an example to form the stack and the rotor, although other rotor components may be used. Each rotor lamination 42 has a generally circular cross-section and is formed of a magnetic permeable material, such as electrical steel. Extending from end-to-end, i.e., transverse to the cross-section, each lamination 42 includes features that, when aligned with adjacent laminations 42, form cumulative features that extend axially through the stack of laminations, which may be the entire rotor core. For example, each exemplary rotor lamination 42 has a circular shaft aperture 62 located in the center of the lamination 42. The shaft apertures 62 of adjacent laminations 42 cooperate to form a shaft chamber configured to receive the rotor shaft 26 (see FIG. 2) therethrough. Additionally, each lamination 42 includes apertures 64 that are arranged at positions about the lamination such that when assembled, the apertures cooperate to form passages 66 that extend through the stack, and which may extend through the rotor core 44 depending upon the arrangement of the stack(s). Depending upon the application, some of the passages 66 may be configured to receive magnet material 68, which may be by way of example, sintered magnets, permanent magnets, or magnetizable material. Depending upon the application, some of the passages 66 may be configured to receive a fixation material 70 to fix the laminations together. Depending upon the application, the passages 66 that receive the magnet material 68 may also receive fixation material 70. FIGS. 2 and 18 show examples of magnet material 68 received in the passages 66 and the fixation material 70 received in the same passages 66 to fix the laminations. The magnet material 68 may be received in the passage to a certain length dimension relative to the stack length dimension, and the fixation material may be received in the passage to fill the passage, and/or form a sprue as will be described below. Depending upon the application, certain of the passages 66 may be configured to receive the magnet material 68. After those passages 66 are filled with the magnet material 68, the fixation material 70 may be introduced into those passages and other vacant passages to provide additional fixation for the stack and flux shaping as needed. Depending upon the application, the fixation material may be used in selected passages, and the magnet material may be omitted from the rotor, for instance, in the case of a synchronous reluctance type motor.

The fixation material 70 and/or magnet material 68 may be filled into the passages 66 as part of an injection molding process or compression molding process. The magnet material 68 may comprise a polymer bonded composite magnet material and the fixation material 70 may comprise a neat polymer, nylon, or a fiber reinforced polymer. For further mechanical integrity and strength of the fixation material 70, reinforcing fibers may be included in the fixation material. A non-exhaustive list of fixation materials includes Acrylonitrile Butadiene Styrene (ABS), Polyamide-Nylon with or without glass filling (PA), polycarbonate (PC), Polyethylene (PE), Polypropylene (PP), Polystyrene (PS), Acetal (POM), Low Density Polyethylene (LDPE), and Density Modified High Gravity Compounds.

As a result of the injection molding or compression molding process, one or more sprues 72 may be formed on the axial face of the stack 44. Depending upon the application and the arrangement of the injection molding or compression molding process, one or more sprues 72 may be provided on axially opposite ends of the stack 44, or rotor core 46 as the case may be. The sprues 72 may be shaped and formed as needed depending upon the application. As described below, the sprue(s) 72 may be configured as a cylindrical body(ies) or end plate(s). In addition, the sprue(s) 72 may be configured and formed for additional functionalities such as cooling fins or with locating structures defining reference positions for measuring equipment, and/or the attachment of fixtures and/or tooling used during the injection molding or compressing molding process. The sprue(s) may also be configured to locate, retain, or secure an end ring or other plate to provide additional structural integrity for the rotor assembly.

In FIGS. 3-8, the sprue 72,72' is formed in a contiguous manner on the entire outer face of the axial outermost lamination of the stack 44, thereby forming an end plate for the stack with a thickness. While one sprue 72,72' is shown in FIGS. 3-8 on one axial side of the stack 44, a similar sprue may be formed on the opposite axial side of the stack. In the arrangement shown in FIGS. 3-8, a mold may be formed around the axial end of the stack 44 and after magnet material 68 is inserted in the passages 66, the fixation material 70 may be filled in the passages and out beyond the axial outermost lamination of the stack to form the sprue 72,72' as an end plate covering the outermost lamination of the stack. In the arrangement shown in FIGS. 3-5, the end plate formed sprue 72 may have a generally flat structure. In the arrangement shown in FIG. 6-8, the end plate formed sprue 72' may have a pocketed outer axial face 74 forming a cellular or honeycomb type structure with a plurality of open cells 76. To balance the rotor of FIGS. 3-5, the end plate formed sprue 72 may be selectively machined, and/or balancing material added, as needed to adjust the weight of the sprue and its weight/mass distribution, and rotationally balance the rotor about the rotor center axis 45. To balance the rotor of FIGS. 6-8, balancing material may be inserted into any one of a plurality of open cells 76 in the pocketed face, open cellular, honeycomb-type structure 74 to adjust the weight of the sprue 72' and rotationally balance the rotor about the rotor center axis 45. To the extent material needs to be removed for balancing, a portion of sprue comprising the pocketed face, open cellular, honeycomb-type structure 74 or the end plate may be removed as necessary.

Figures 12, 13:
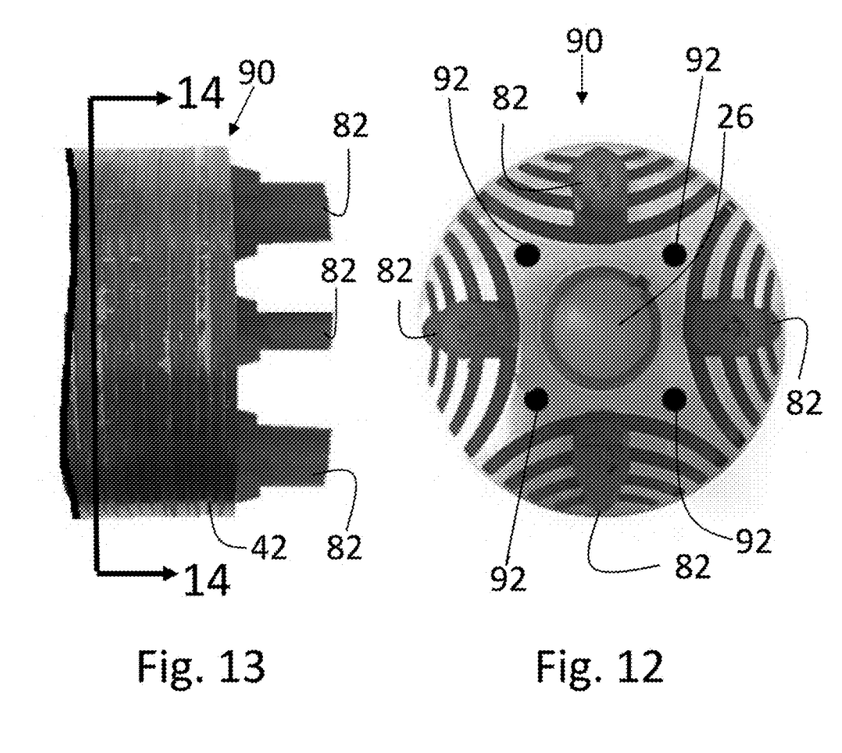
FIG. 12 is an end view of another embodiment of a rotor of the motor of FIG. 1.
FIG. 13 is a partial, side view of a portion of the rotor of FIG. 12.
Figure 14:
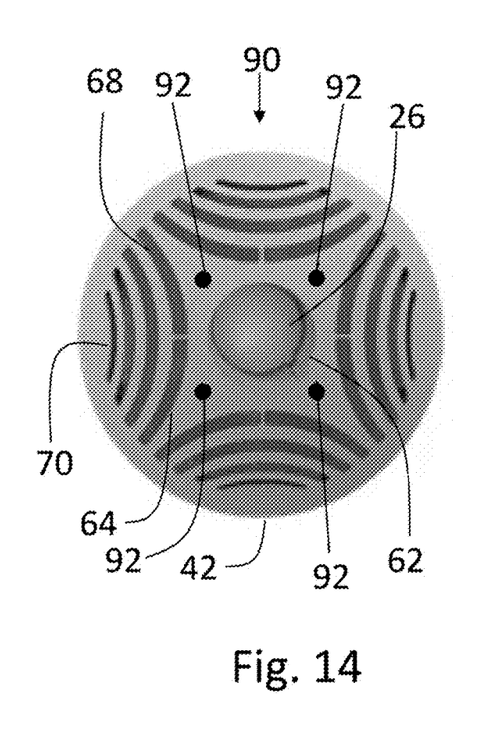
FIG. 14 is a cross section view of the rotor along plane 14-14 of FIG. 13.

FIGS. 9-14 show alternate embodiments of a stack 80 where several sprues 82 are formed about the outer face of the axial outermost lamination of the stack. While several sprues are shown in each of the embodiments of FIGS. 9-14 on one axial side of the stack, sprues may be formed in a like manner on the opposite axial side of the stack. Depending upon the application, the sprues 82 shown by example in FIGS. 9-14 may be preferred to the sprues 72,72' of FIGS. 3-8 in that it allows for less material to be used for fixation. By way of example, in FIGS. 9-14, the sprue 82 may be formed in a sector (e.g., in the drawings, a quadrant) of the stack 80, which may correspond to a pole of the rotor. The magnet material 68 may be filled into the passages 66 designated as magnet slots of the lamination 42, and the fixation material 70 may be then filled into the same passages to form the substantially cylindrically shaped sprue 82 shown in the Figures in a sector of the rotor. Certain of the passageways 66 may contain both permanent magnets or magnet material 68, and the fixation material 70. Certain other passages may solely contain the fixation material 70. For instance, in the embodiment shown in FIGS. 9-11, the radially outermost U-shaped passage may be reserved solely for fixation material 70, while other radially inward U-shaped passages may contain both fixation material 70 and magnet material 68. A synchronous reluctance motor may omit the magnet material and fixation material may be filled in selected passages 66. FIGS. 12-14 show an alternate embodiment where the stack 90 contains passageways 92 radially inward adjacent to the shaft aperture 62 that solely contain fixation material, and the other radially inward U-shaped passages 66 may contain both fixation material 70 and magnet material 68. As described before, the sprues 82 may be machined as necessary to adjust the weight of the sprues and rotationally balance the rotor about the rotor center axis 45. Additionally, balancing material may be inserted in one or more of the sprues 82 for adjusting the weight of the sprues and rotationally balancing the rotor about the rotor center axis 45. In the embodiment shown in FIGS. 12-14, the fixation material 70 may be removed from the radially inward passages 92 to further assist in balancing.

Figure 15:
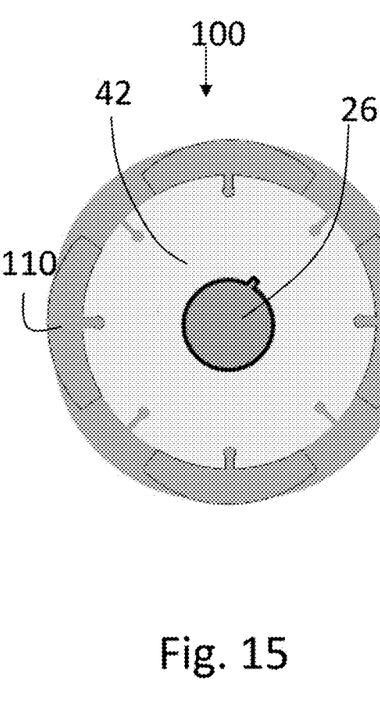
FIG. 15 is an end view of another embodiment of a rotor of the motor of FIG. 1.
Figure 16:
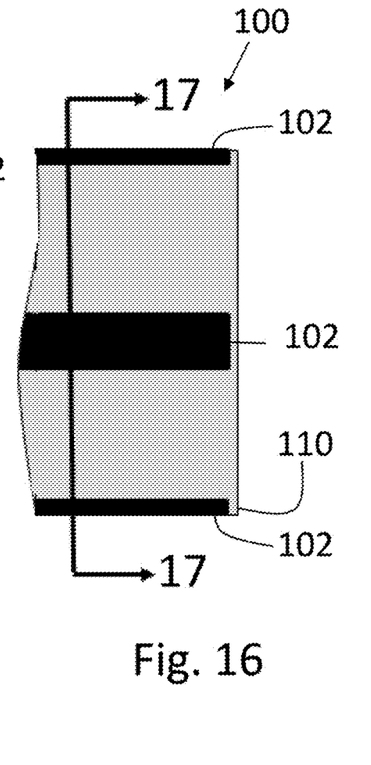
FIG. 16 is a partial, side view of a portion of the rotor of FIG. 15.
Figure 17:
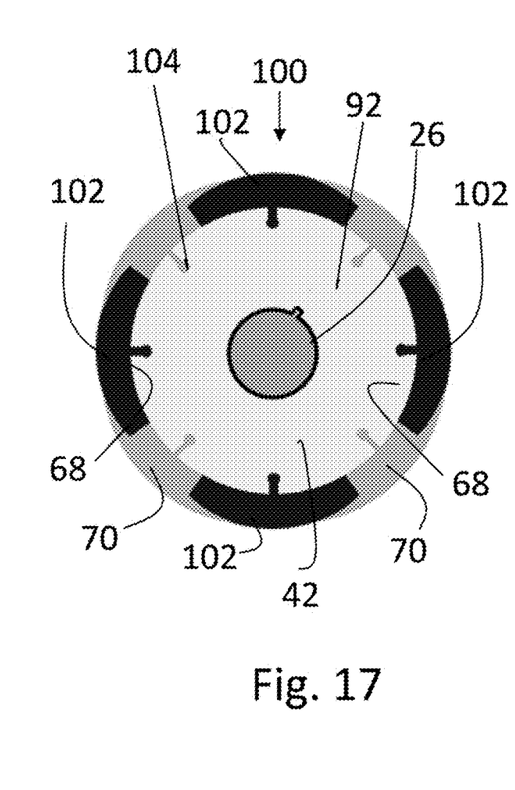
FIG. 17 is a cross section view of the rotor along plane 17-17 of FIG. 16.

FIGS. 15-17 show an alternate embodiment and construction for the stack 100 comprising a plurality of surface magnets 102 formed from the magnet material 68. Again, the like laminations 42 are arranged side-by-side to form the stack 100. The apertures 104 in the laminations are aligned in a manner so as to cooperate and form channels 106 that extend axially through the stack 100. The channels may extend radially inward in the lamination from the outer diameter surface of the lamination to provide additional structure integrity for the magnets. The magnet material 68 may be filled into certain locations around the rotor to form the surface magnets, and then the fixation material 70 may be filled and molded over the magnet material to lock the magnet material in place in an overmolded arrangement. The fixation material 70 may extend from the outer face of the outermost axial lamination in the form of a sprue 110. The sprue 110 may have the form of an annular, end ring-type structure extending axially outward from the axial outermost lamination of the stack. The sprue 110 in the form of the annular, end ring-type structure may then be adjusted as needed to rotationally balance the rotor about the rotor center axis. Balancing material may be inserted in the sprue 110 or the sprue may be machined in order to adjust the weight of the sprue and rotationally balance the rotor about the rotor center axis 45

FIG. 18 shows an alternate embodiment of a rotor 46' for the motor where a plurality of stacks 44' of laminations are arranged side-by-side in spaced apart arrangement along the rotor with their apertures aligned to form passages 66 extending axially through the stack 44'. After magnet material 68 is filled into the passages 66, the fixation material 70 may be filled through the passages 68. The mold used in the injection molding or compressing molding process may include forms which create ducts 120 extending through the passages 68. The ducts 120 may extend axially through the stacks and overall through the rotor. The ducts 120 may also extend radially outward between adjacent spaced apart stacks of laminations 44'. As the fixation material is filled, it may flow around the forms and define the ducts 120 in the passages while locking the laminations together and overmolding the magnet material. The sprue 72 may comprise the form of an end place as described above in reference to FIGS. 3-8 or may comprise the cylindrical structure as described above in reference to FIGS. 9-14, and may be adjusted in the same ways discussed above to rotationally balance the rotor 46' about the rotor center axis 45.

Figure 19:
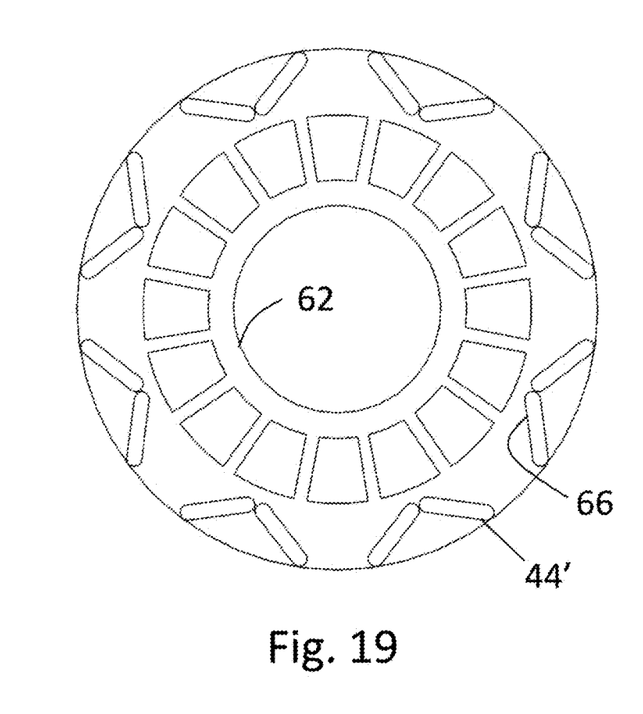
FIGS. 19-22 show an embodiment of a stack of a ducted motor of the type shown in FIG. 18 undergoing a sequence of operations to fill magnets slots of the stack with magnet material and forming sprues on axial face of the stack.
Figure 20:
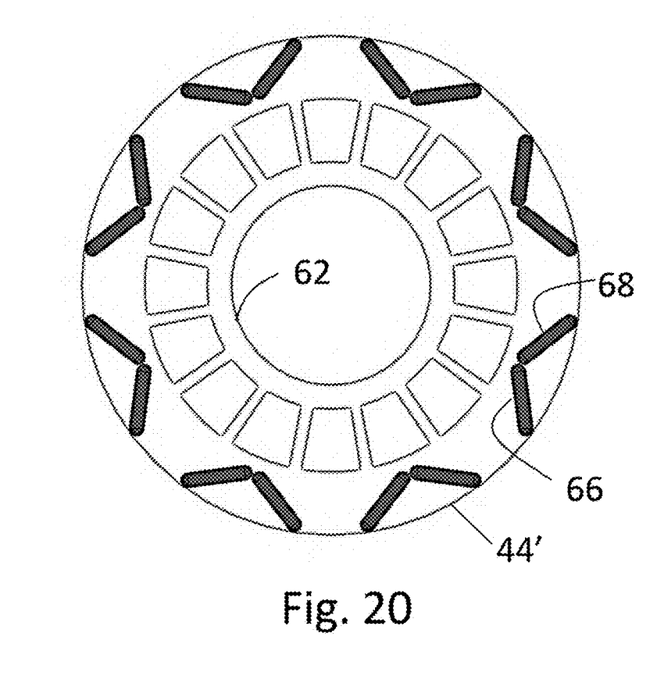
Figure 21:
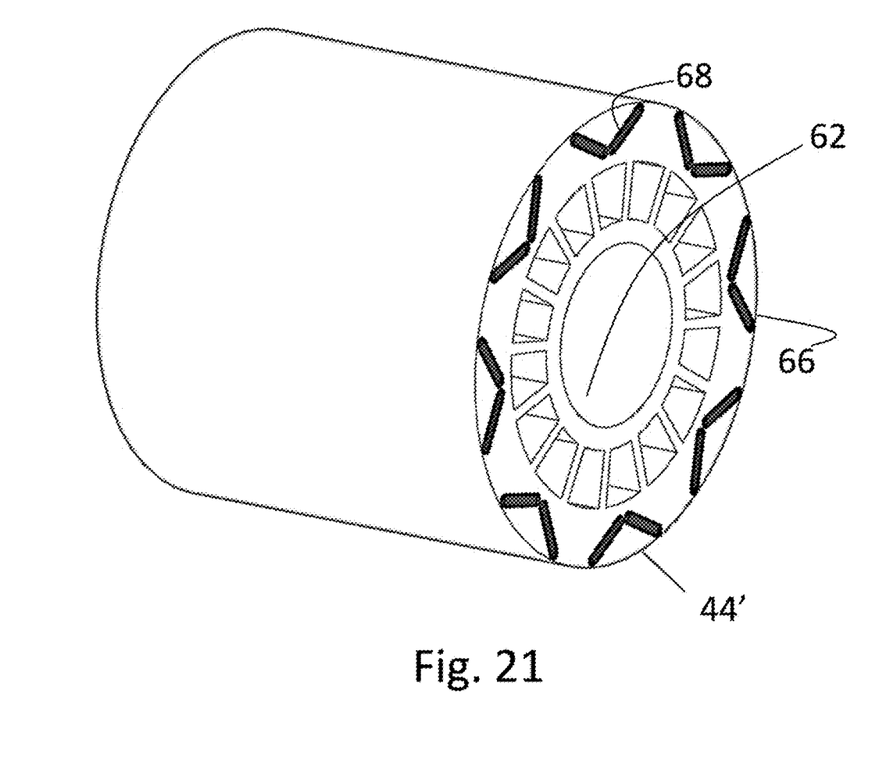
Figure 22:
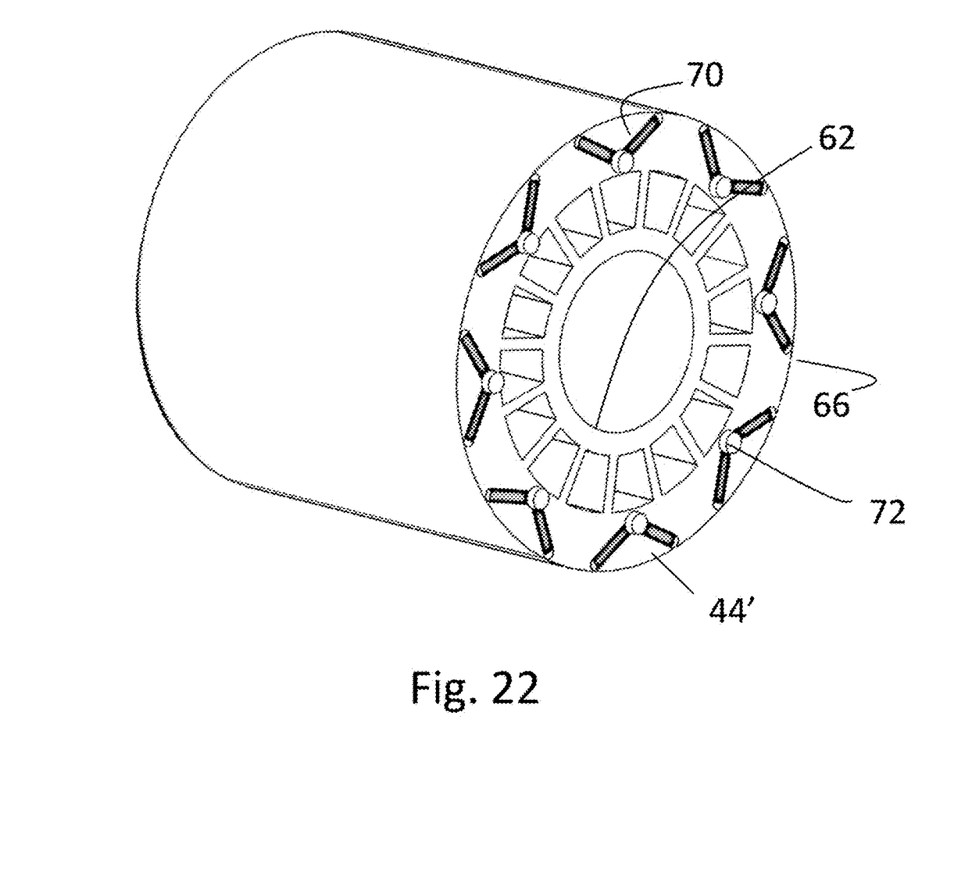
Figures 23, 24:
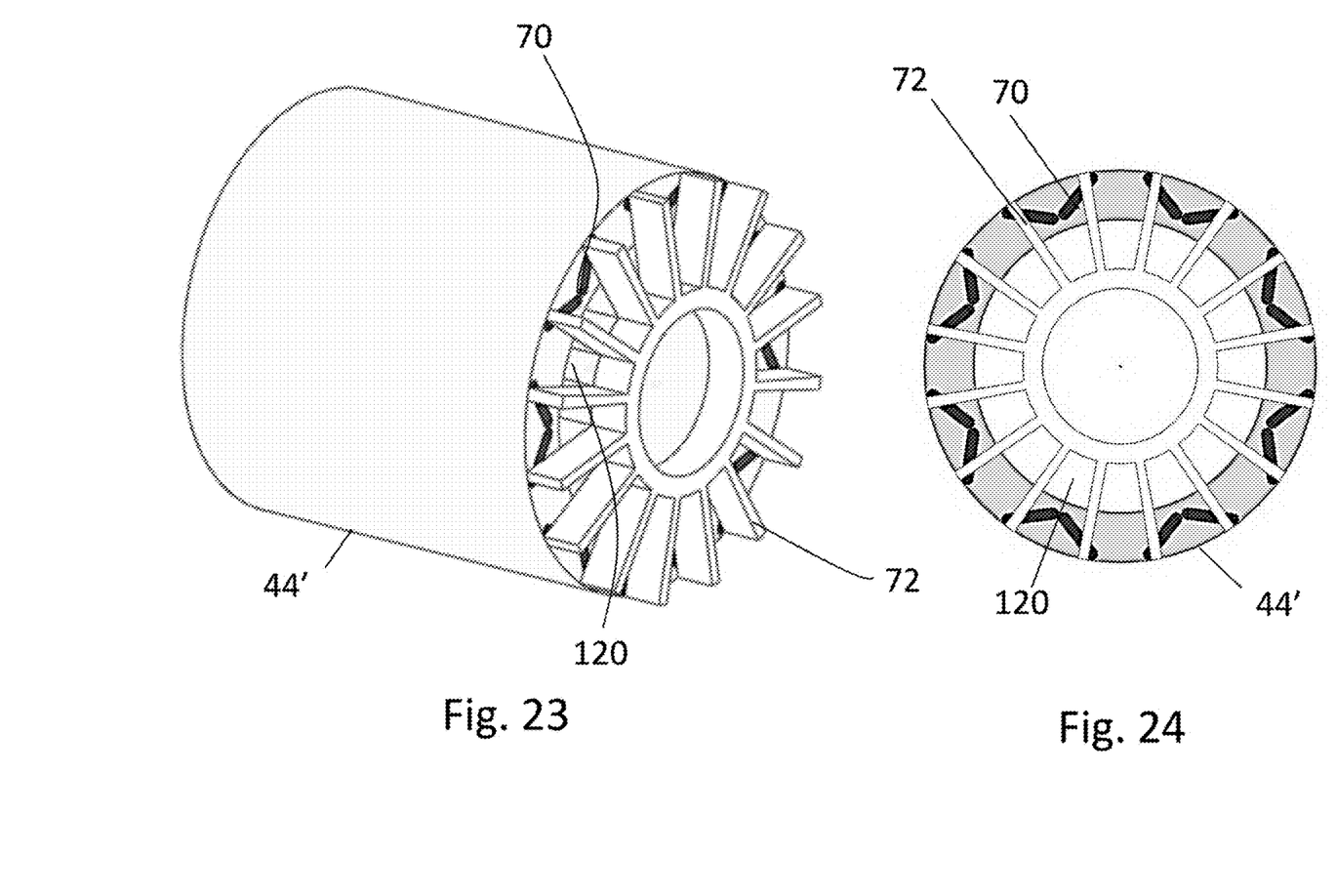
FIGS. 23-24 show an embodiment of a stack comprising a portion of the rotor assembly of the motor of FIG. 18.
Figure 25:
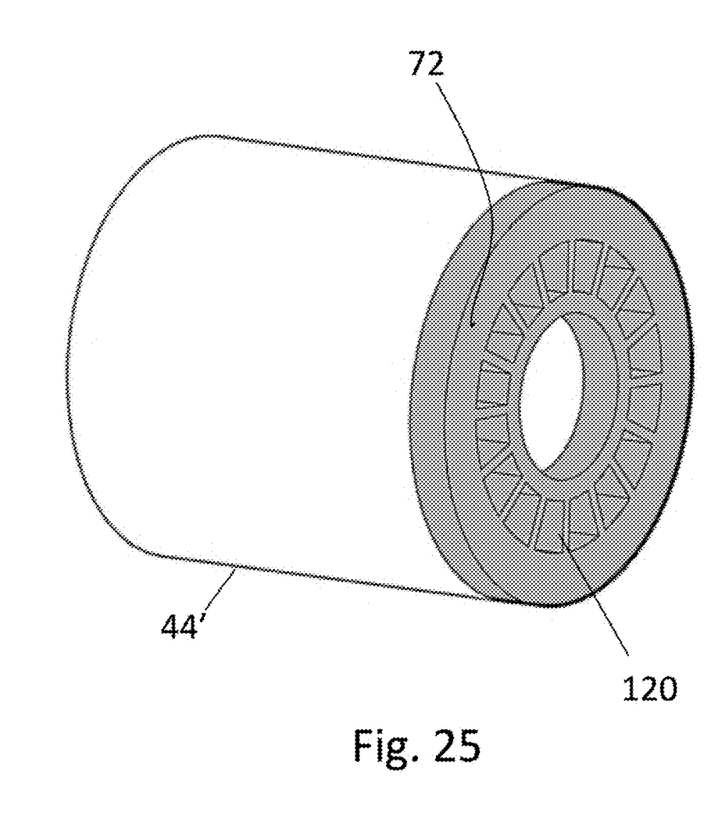
FIGS. 25-26 show an embodiment of a stack comprising another portion of the rotor assembly of the motor of FIG. 18.
Figure 26:
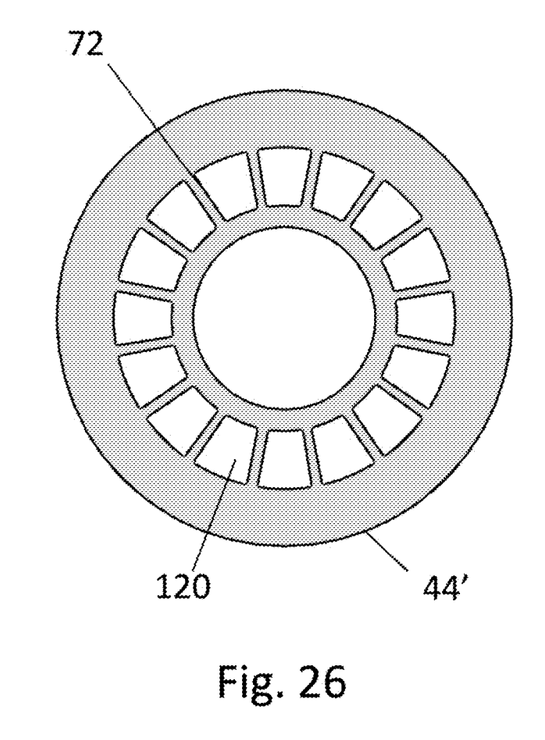

FIGS. 19-26 show additional aspects of the radially ducted rotor of FIG. 18. In particular, FIGS. 19-21 shows a stack 44' with a plurality of passages 66 comprising V-shaped magnets slots configured to receive magnet material 68 as described previously. The passages 66 comprising the magnets slots of the stack 44' may extend actually through the stack in the manner described previously. The magnet material 66 may be filled in the passages 66 comprising the magnet slots to a certain depth. Once the magnet material 68 is filled in the passages, the fixation material 70 may be filled in the passages 66 comprising the magnets slots, and may include a sprue 72 extending axially from the face of the stack 44'. The magnet material 68, fixation material 70, and/or sprue 72 may be compression or injected molded as described above. The sprue 72 on the axial face of the stack 44' may function as a locator or retainer as shown for an end ring configuration as shown in FIG. 25-26 or may form the radially spoked arrangement for a radially ducting of the stack 44' forming the rotor assembly 40. In FIGS. 25-26, the sprue 72 may comprises the spoke configuration extending from the axial face of the stack. In FIGS. 23-24, the sprue 72 may comprise a cylindrical nub that enables attachment of an separate end ring or the sprue may be formed as an end ring. Thus, in the embodiment of the radially ducted motor shown in FIG. 18, a plurality of stacks of the type shown in FIGS. 23-24 may be arranged in an axially spaced apart manner to form the axially inward portion of the rotor assembly, and stacks of the type shown in FIGS. 25-26 may form the axial outward portions of the rotor assembly with the stacks having the sprues with radial spokes therebetween.

While certain embodiments have been described in detail in the foregoing detailed description and illustrated in the accompanying drawings, those with ordinary skill in the art will appreciate that various modifications and alternatives to those details could be developed in light of the overall teachings of the disclosure. Particularly, the figures and exemplar embodiments of the rotor laminations are intended to show illustrative examples and not to be considered limiting in any sense. Accordingly, the particular arrangements disclosed are meant to be illustrative only and not limiting as to the scope of the invention which is to be given the full breadth of the appended claims and any and all equivalents thereof.

What is claimed is:

1. A method comprising:
arranging a plurality of rotor components in a stack as to form at least part of a rotor, the rotor having a rotational center axis;
forming at least one passage in the stack;
filling at least one passage with a polymer based fixation material, wherein the step of filling the at least one passage with the fixation material in a manner to fix the laminations together includes filling the at least one passage with the fixation material in a manner to form cooling ducts extending radially through the rotor between the spaced apart stacks;
with the fixation material, forming a sprue projecting from an axial face of the stack; adjusting a weight of the sprue to rotationally balance the rotor about the rotor center axis.

2. The method of claim 1 wherein the step of forming the sprue in the stack comprises forming an end plate for the stack.

3. The method of claim 1 wherein the step of forming the stack comprises forming cooling fins extending axially from the stack.

4. The method of claim 1 wherein the step of forming the sprue in the stack comprises forming an open cellular structure in the sprue, and the step of rotationally balancing the rotor about the rotor center axis by adjusting a weight of the sprue includes placing a balancing material in at least one open cell of the cellular structure.

5. The method of claim 1 wherein the step of rotationally balancing the rotor includes removing a portion of the sprue.

6. The method of claim 1 further comprising arranging a plurality of stacks spaced apart from one another along the rotor center axis.

7. The method of claim 1, further comprising at least one of overmolding and filling the fixation material around the magnet material disposed in the stack.

8. The method of claim 1, wherein the step of filling the fixation material in the at least one passage includes filling at least one passage devoid of magnet material with the fixation material.

9. The method of claim 1, wherein the step of filling the fixation material in the at least one passage includes filling at least one passage containing magnet material with the fixation material.

\* \* \* \* \*